United States Patent

[11] 3,578,250

[72] Inventors William H. Combs
Wayne;
Sam N. Craig, Devon; Ellis R. Warner, Jr.,
West Chester; Wayne T. Buckman,
Pipersville, Pa.
[21] Appl. No. 751,536
[22] Filed Aug. 9, 1968
[45] Patented May 11, 1971
[73] Assignee Wascon Systems, Incorporated
Hatboro, Pa.

[54] PULPING APPARATUS
16 Claims, 8 Drawing Figs.
[52] U.S. Cl................................................... 241/46.02,
241/46.11, 241/74
[51] Int. Cl...................................................... B02c 18/12,
B02c 18/22, B02c 18/40
[50] Field of Search........................................... 241/46,
46.06, 46.11, 46.02, 46.04, 220, 260—261, 257,
296, 298, 74, 98

[56] References Cited
UNITED STATES PATENTS
2,852,200  9/1958  Holzer........................... 241/46.11
2,947,486  8/1960  Higer............................. 241/46.11X
3,071,328  1/1962  Higer............................. 241/46.11
2,852,199  9/1958  Holzer........................... 241/46.11X
3,145,936  8/1964  Monks........................... 241/296X
3,164,329  1/1965  Wandel......................... 241/46.02X Primary Examiner—Donald G. Kelly
Attorney—Paul & Paul ABSTRACT: A pulping apparatus is provided, adapted to receive therein solid debris for comminution to a desired size in a liquid medium, such as water, Water and debris are received in the bottom of a tank having a disclike impeller rotatably driven at the bottom thereof and a sizing ring disposed at the bottom of the tank about the impeller whereby, during rotation of the impeller, there is effected a size reduction of solid particles by means of teeth carried by the impeller. Debris which is sufficiently sized passes through holes in the sizing ring an is discharged from the pulping tank. A particularly novel structure is provided for effecting a scissorslike cutting action by means of cutting elements carried by each of the tank and the rotatable impeller. A novel configuration is also provided for the outermost edge of the impelling disc, relative to the sizing ring such that fluid and debris in the tank is driven across their common running clearances passage, rather than through the passage. A ramp is also provided, centrally located relative to the impeller, for preventing balling-up of rags and the like at the center of the impeller.

Patented May 11, 1971
3,578,250
2 Sheets-Sheet 1
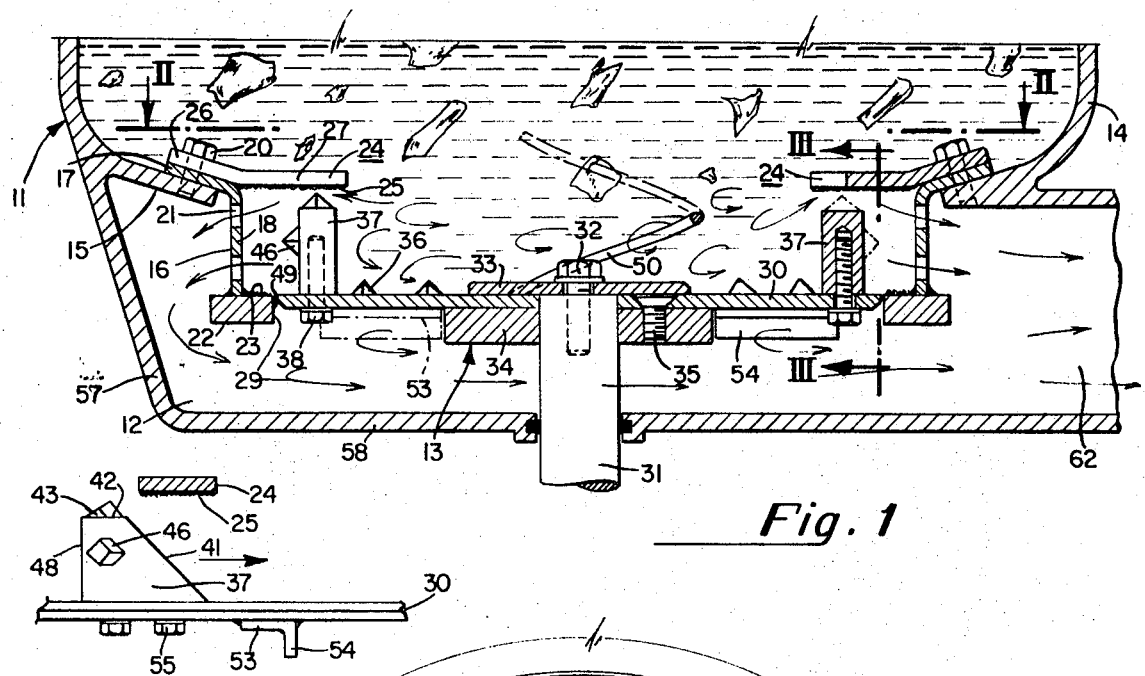
Fig. 1
Fig. 3
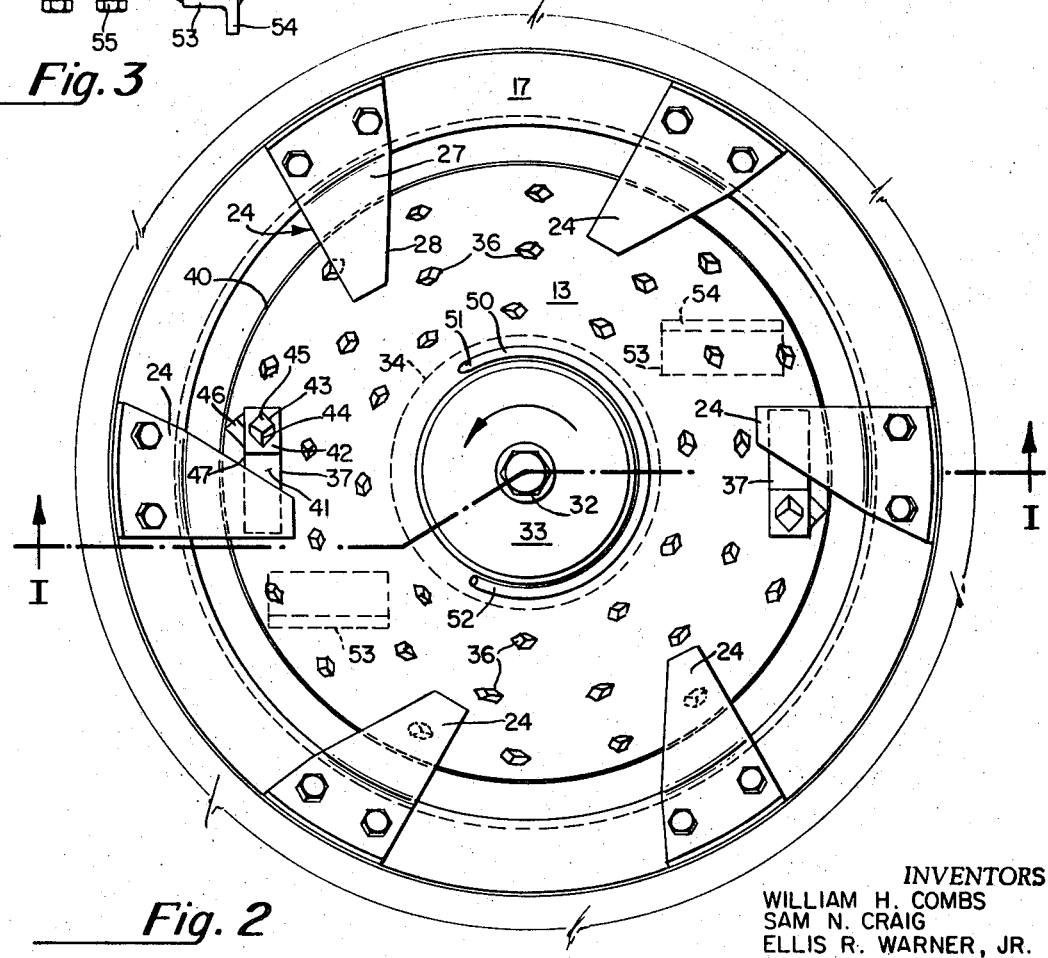
Fig. 2
INVENTORS.
WILLIAM H. COMBS
SAM N. CRAIG
ELLIS R. WARNER, JR.
WAYNE T. BUCKMAN
BY Paul + Paul
ATTORNEYS.

Patented May 11, 1971

INVENTORS.
WILLIAM H. COMBS
SAM N. CRAIG
ELLIS R. WARNER, JR.
WAYNE T. BUCKMAN

BY *Paul & Paul*

ATTORNEYS.

3,578,250

PULPING APPARATUS

BACKGROUND OF THE INVENTION

In recent years trash disposal has become a major problem, especially in urban areas, where large concentrations of people produce large quantities of trash.

Various steps have, therefore, been taken directed toward waste disposal, many of which involve waste comminution, whereby solids are reduced in size an amount sufficient to facilitate subsequent disposal. The subsequent disposal may either be by collection or by pipeline disposal, in either instance the final disposal operation being considerably less difficult if the original volume of waste has been reduced by a factor of 75 percent or 80 percent.

In this regard, apparatus has been developed such as the pulping apparatus of application Ser. No. 580,445 filed Sept. 20, 1966, now Pat. No. 3,489,356, issued Jan. 13, 1970, which has been successful in reducing the particle size of trash mixtures while such mixtures are submerged in water. Such apparatus is generally referred to as pulping apparatus due to the submerged nature of the debris during comminution.

While the pulping apparatus of the application identified above has operated in a highly successful manner, improvements have been made therein which enhance the ability of the pulping apparatus to handle various materials such as plastic sheets, rags and the like in addition to the assorted debris which the pulping apparatus has previously been able to handle effectively.

In particular, it has been found highly desirable to provide some means for reducing the size of large plastic sheets, rags and the like which would more effectively and more efficiently comminute such debris.

Another problem which the present invention is directed toward has also been the handling of rags and like debris which could possibly tend to ball-up at the center of the impeller.

Other efforts have been made toward preventing jamming of the impeller by particles becoming lodged beneath the impeller or otherwise retarding the effectiveness of the impeller rotation.

SUMMARY OF THE INVENTION

The present invention is directed toward solving some of the problems heretofore present in pulping apparatus and toward providing a more effective and more efficient apparatus which is capable of handling a wider range of materials for immediate size reduction. In this regard, a device is provided centrally of the impeller and carried thereby which is effective for discarding rags or the like which may otherwise tend to ball-up, and which impells such rags or other debris toward a radial outward portion of the impeller where comminution will be more effective. Also, it has been found that a scissorslike cutting action is effective for reducing the size of various trash components, and in this regard one or more fixed blades are carried by the pulping tank in close relationship to upstanding "ski blocks" or similar upstanding cutting members for effectively shearing various materials during the pulping process. The impeller disc has also been arranged relative to the sizing ring and "ski blocks" to direct fluid and particles through the sizing ring across the opening between the disc and sizing ring, and not through the opening.

Accordingly, it is a primary object of this invention to provide an apparatus for more effectively pulping various debris into particles of reduced size.

It is another object of this invention to provide a pulping apparatus which includes a means for shearing various debris by a scissorslike action between relatively movable cutting elements.

It is a further object of this invention to accomplish the above objects wherein a rotating impeller is utilized which includes a device for preventing a "dead" space above the center thereof, whereby various debris is effectively transferred to a comminuting zone of the apparatus.

It is a further object of this invention to accomplish the above objects in a manner which prevents clogging of the sizing ring and/or the rotary impeller.

Various objects and advantages of the present invention will be readily apparent to one skilled in the art upon a study of the following brief description of the drawing FIGURES, detailed description of the preferred embodiments, and the appended claims.

IN THE DRAWINGS:

FIG. 1 is a vertical sectional view of the lowermost portion of a generally cylindrical pulping tank of this invention, taken generally along the line I-I of FIG. 2, and wherein various comminuting or cutting elements are illustrated.

FIG. 2 is a top plan view of the lower portion of the pulping tank illustrated in FIG. 1, wherein the relative disposition of the fixed and moving cutting elements is clearly illustrated along with the centrally located ramp means carried by the rotatable impeller.

FIG. 3 is a fragmentary view taken generally along the line III-III of FIG. 1, wherein there is illustrated, in side view, the relative relationship between a fixed blade carried by the tank and a movable blade carried by the rotatable impeller of this invention.

Figure 5:
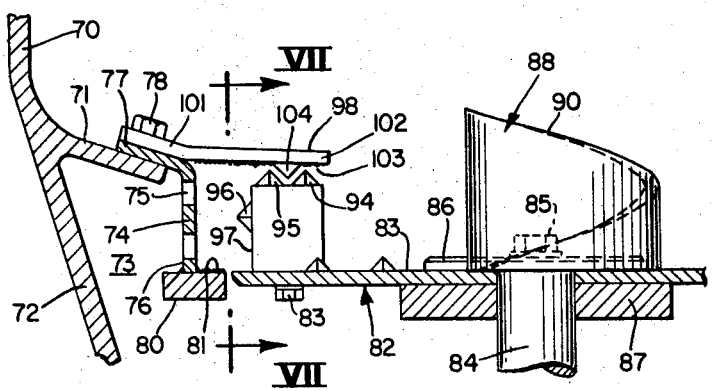
FIG. 5 is a fragmentary vertical sectional view of an alternative pulping apparatus of this invention utilizing a different type of scissorslike cutting means and a different form of ramp means.
Figure 4:
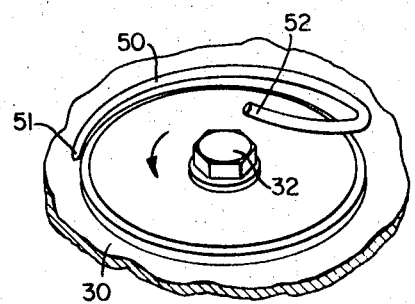
FIG. 4 is a fragmentary perspective view of the ramp means of FIGS. 1 and 2 carried centrally of the impeller disc.

Referring now to the drawings in detail, reference is first made to FIG. 1, wherein there is illustrated the pulping apparatus of this invention generally designated by the numeral 10, including an upper tank portion 11, a lower chamber 12, and a rotary impeller, generally designated by the numeral 13.

The tank portion 11 comprises a generally cylindrical chamber 14 terminating at its lower end in a radially inwardly directed but downwardly sloped annular flange 15.

An annular sizing ring 16 has a flange 17 extending obliquely from a sidewall 18 thereof, the flange 17 being bolted or otherwise secured to the flange 15 of the tank by means of suitable cap screws 20 or like fasteners. The sizing ring 16 is provided with a plurality of sizing holes 21 extending therethrough about the cylindrical portion 18 thereof. The holes 21 are generally of a substantial number; for example, in the embodiment illustrated, the sizing ring 16 may have 180 holes, each five-eighths inch in diameter. At the bottom of the sizing ring 16 there is provided a lowermost ring portion 22 welded or otherwise suitably connected to the ring 16. An abrasive such as frit or the like 23 is imbedded or otherwise secured in an upper inner surface of the ring portion 22 for a purpose later to be described.

A plurality of equidistantly arcuately spaced fixed blades 24 are bolted to the tank flange 15, by the bolts 20 or similar fastening means, the fixed blades 24 also having a frit or other abrasive 25 on a lowermost surface thereof. Each blade 24 includes a connecting portion 26 and a cutting portion 27, angularly offset relative to the connecting portion 26. Each cutting portion 27 may be disposed substantially horizontally or at a slight angle to the horizontal such that the radial innermost end of the fixed blade 27 would progress toward the bottommost portion of the tank 11 as it progresses radially inwardly.

With particular reference to FIG. 2, it is seen that the cutting portions 27 of the fixed blades 24 each extend part way across the impeller 13, and each have a chamfer or angularly cutaway edge 28, for providing a scissorslike cutting action in a manner later to be described.

The impelling means 13 comprises a disc 30 secured to a rotatable shaft 31 by means of a cap headed screw 32 or other suitable fastening means and a washer 33 with a supporting disc 34 being press fit or otherwise carried by the shaft 31, such that the disc 30 is sandwiched between the washer 33 and the disc 34. A screw 35 may connect the disc 30 and supporting disc 34 to prevent relative rotation thereof.

The disc 30 comprises a flat steel plate, for example, three-eighths inch thick to which are attached generally by silver soldering or the like, a plurality (for example 30) of tungsten carbide teeth 36. The teeth 36 are cut on a diagonal from one-half inch cubes or the like according to the disclosure of application Ser. No. 580,445 filed Sept. 20, 1966, referred to hereinabove.

A pair of upstanding cutting members 37, are provided, and are generally termed "ski blocks" each of which are carried by the disc plate 30 by screws 38 or the like and which extend upwardly from the plate 30, being disposed in chordlike disposition relative to the outer edge 40 of the impeller plate 30.

Each cutting member 37 has a downwardly sloping or chamfered leading surface 41, which terminates at its lower end at the upper surface of the disc 30 and which terminates at its upper end in a flat or horizontal surface 42 to which there is secured a tungsten carbide tooth 43, generally similar to the teeth 36, and similarly oriented with a leading backwardly sloped edge 44 at a substantially right angle to a trailing surface 45, in a manner similar to the teeth of the application mentioned above. A similar such tooth 46 is soldered or otherwise secured to a radial outermost surface 47 of each of the "ski blocks" 37, the tooth 46 also being similarly oriented relative to the direction of rotation of the impeller 13.

Each "ski block" 37 is constructed and so positioned relative to the sizing ring 16 that the apex of its uppermost tooth 43 is greater than one-quarter inch but preferably approximately three-quarters of an inch from the cylindrical portion 18 of the sizing ring 16.

Each leading surface or end 41 of an associated "ski block" 37 facilitates an upward lifting of particles whereby particles may become sheared in scissorslike fashion between the edge 28 of a fixed blade and a tooth 43 of a "ski block" 37. A trailing end 48 of a "ski block" 37 may comprise a generally perpendicular surface relative to the disc 30, for providing sufficient turbulence in the wake of the "ski block" 37 to provide a reverse flow component of a fluid pulsing effect caused by the impeller 13 in a manner later to be described.

A ramp means 50 is provided, welded or otherwise secured to the disc 30, about the washer 33 in the form of a helical wire comprising approximately two-thirds of a complete revolution as viewed in plan and having a pitch sufficiently large to enable it to reach substantially the elevation of the upper end of a "ski block" 37 or beyond, the wire 50 being welded at its lowermost end 51 to the disc 30 and having a free upper end 52.

A pair of angles 53 are provided, being of L-shaped cross section and are welded or otherwise secured to the lowermost surface of the disc 30, disposed in offcenter relation as viewed in FIG. 2 each having a lowermost flange portion 54 extending downwardly therefrom, into the tank evacuation cavity 12 for impelling fluid and approximately sized debris outwardly of the chamber 12. The L-shaped sections 53 may be secured to the disc 30 by means of cap headed screws 55 or the like as desired.

The chamber portion 12 is defined by a generally sloped angular sidewall 57 and a bottom wall 58, the bottom wall having a bore 60 therein in which there is received the shaft 31, sealed against fluid loss during rotation by suitable packing or seal 61. At the rightmost end of the chamber 12, as viewed in FIG. 1, there is illustrated an outlet opening 62 for comminuted particles and liquid.

OPERATION

The apparatus of FIGS. 1 through 4 is operative to provide extended periods of operation without clogging, wherein debris is reduced to particles of the desired size. The impeller 13 is rotated in a counterclockwise direction, as illustrated in FIG. 2, such that any rags or the like debris which may tend to ball-up or accumulate in the center of the disc 30 are engaged by the lowermost portion 51 of the coil ramp means 50, and are lifted upwardly by the rotation of the coil 50 to be thrown or tossed radially outwardly after passing the upper end 52 of the coil 50 to an outermost portion of the tank 11, for undergoing further pulping.

Also during rotation of the impeller 13, rags, sheets of plastic and the like will be partially reduced in size as will cans, bottles and the like, by means of the teeth 36 in the manner set forth in the above mentioned application. However, rags and plastic sheets and similar such articles, such as sheet metal and the like may be sheared to smaller sizes upon being engaged by the sloped surface 41 of a "ski block" 37 and lifted upwardly until the "ski block" 37 approaches a fixed blade 27 carried by the flange 15 of the tank 11. The debris is then sheared in a scissorslike fashion between the leading edge 44 of the tooth 43 mounted on a surface 42 of the "ski block" 37 and the adjacent chamfered or sloped edge 28 of the fixed blade 27 toward which the tooth 43 is moving in its rotation. The tearing of rags, plastic and the like is further facilitated by the abrasive 25 on the lower surface of the fixed blade 24.

Also during rotation of the impeller 13, fluid and debris is thrown radially outwardly by centrifugal force toward the sizing ring 16. Particles which have been reduced to sufficient size to pass through the holes 21 of the sizing ring 16 may pass through the ring 16 but particles which are not of a sufficiently reduced size, such as sheets of plastic and the like may be thrown against and remain across holes 21 in the sizing ring 16, blocking the passage of fluid therethrough. This effect is overcome as each of the "ski blocks" 37 passes such holes which may be covered by plastic or the like in that there is a zone of turbulence set up behind each "ski block" adjacent to the perpendicular surface 48 thereof which causes a radial inward rush of liquid thereby "sucking" or drawing the plastic away from the holes 21, and thereby completing a "pulsing" effect provided by the impeller 13 and its carried "ski blocks" 37. Any particles that may tend to reside radially outwardly of the impeller 13, but have not passed through the holes 21 of the sizing ring 16 may be cut or abraded by teeth 46 disposed on the outermost surface of the "ski block." Also, the abrasive surface 25 beneath the fixed blade 24, as well as the abrasive particles 23 on the upper surface of the ring 22 further cooperate to additionally reduce the size of particles within the tank 11.

The outermost edge 40 of the disc 30 is in running clearance with the radial innermost surface 29 of the ring portion 22 defining an annular clearance void 49, or annulus therebetween, of minimum thickness. The disposition of annulus 49 radially inwardly relative to the cylindrical portion 18 of the ring 16 enables the fluid and debris which is impelled radially outwardly to pass through the holes 21, passing over the annulus 49, rather than being impelled therethrough due to the combination of transverse flow of fluid through the holes 21 relative to the downwardly opening annulus 49 and due to the substantial spacing of the annulus 49 from the sizing ring portion 18. Thus, as fluid passes the annulus 49, it is radially outwardly directed relative to the center of rotation of the impeller 13 and not in the high-pressure zone immediately adjacent to the sizing ring 16. Undesirable clogging of the annulus 49 is thus prevented due to its geometrical configuration and unique location.

Referring now to FIG. 5 in detail, another form of this invention is illustrated as comprising a tank 70, generally similar to the tank of the embodiment illustrated in FIGS. 1 and 2, including a radially inwardly and downwardly extending annular flange 71. A lower housing portion 72 provides a lower chamber 73 for receiving liquid and pulp solids which pass through a sizing ring 74. The sizing ring 74 is provided with holes 75 in its cylindrical annular portion 76, and includes an uppermost annular flange 77 which is secured to the annular flange 71 by screw type fastening elements 78. A lowermost ring portion 80 is also welded to or otherwise carried by the sizing ring 74 and is generally similar to the comparable ring portion 22 illustrated in FIG. 1 also having an abrasive 81 on an uppermost inner surface thereof. An impeller 82 is provided comprising a disc 83 carried by a shaft 84 and connected thereto by a screw 85, washer 86 and supporting plate 87.

At the center of the impeller 82, there is provided a ramp means 88, comprising a cutaway section of an arcuate metal sheet which is configured to encompass about two-thirds of a circle. The uppermost edge 90 of the ramp means 88 defines a generally helical path similar to that defined by the wire 50 illustrated in FIG. 4. The ramp means 88 is welded or otherwise connected to the upper surface of the disc 83 outwardly of the washer 86, and is functionally operative in much the same manner as the helical wire 50, but has the additional support provided by the sheet metal configuration of the ramp means 88 as opposed to a wire ramp means 50. While the sheet metal type ramp means 88 is illustrated in FIG. 5, it is to be understood that the wire type of ramp means is also readily operable with the modification of this invention illustrated in FIG. 5, in lieu of the ramp means 88.

On the upper surface of the disc 83 there are arranged a plurality of teeth 91 also generally similar to the teeth 36 illustrated in FIG. 2.

Figure 6:
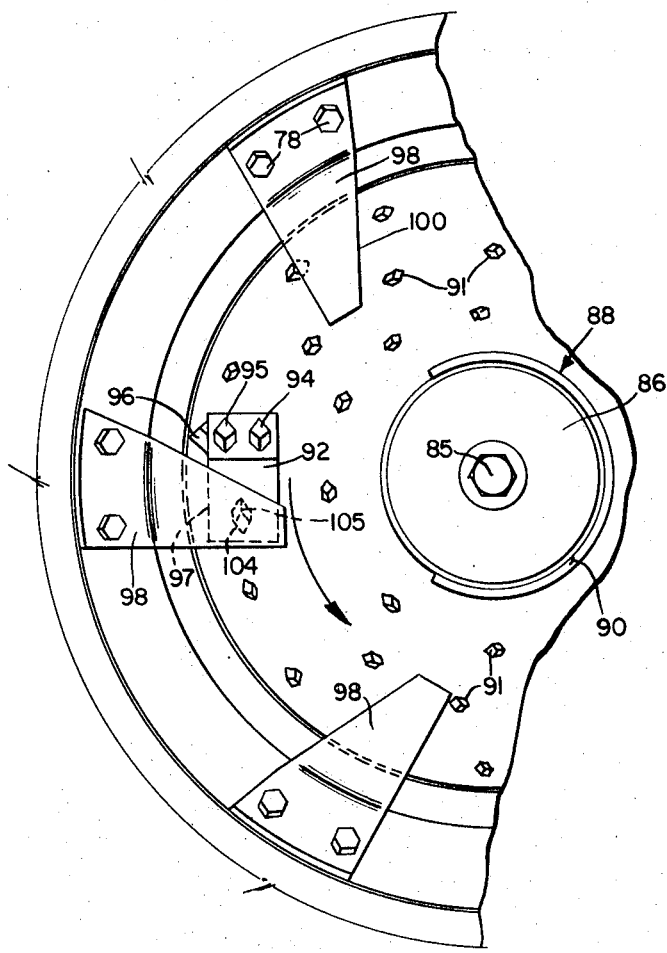
FIG. 6 is a fragmentary plan view of the portion of the pulping tank illustrated in FIG. 5.
Figure 8:
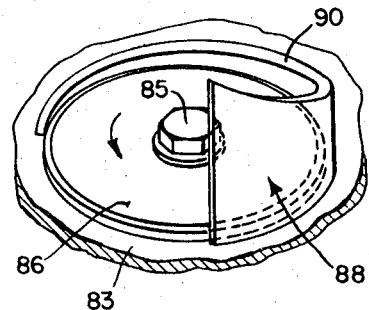
FIG. 8 is a fragmentary top perspective view of the ramp means illustrated in FIGS. 5 and 6 of this invention.

The modification of FIGS. 5 and 6 is principally a modification of the structure which effects a scissorslike shearing action for rags, plastic sheets and other solid particles. A "ski block" 92 is mounted on the disc 83 by means of bolts 93. Generally two "ski blocks" 92 will be provided, each being the general configuration of the "ski blocks" 37 of FIGS. 1 and 2 but being of increased width to accommodate a pair of teeth 94 and 95, these teeth being generally similar in structure and orientation to the teeth 43 of the embodiment of FIGS. 1 and 2. A tooth 96 is also provided on the radial outermost surface 97 of the "ski block" 92 for functioning in a manner similar to the tooth 46 illustrated in FIG. 2.

A plurality of equidistantly circumferentially spaced fixed blades 98 are provided secured to the flange 77 of the sizing ring 74 and consequently to the flange 71 of the tank 70 by the fasteners 78, each fixed blade 98 having a chamfered or angularly cut edge 100 facing the leading edges of teeth 94 and 95 which move there-toward during rotation of the disc 83 in a counterclockwise direction as illustrated by the arrow indicated in FIG. 6. The fixed blade 98 includes a flange portion 101 and a free end portion 102, the free end portion being disposed at a slight angle or being slightly out of parallel with the upper surface of the disc 83, extending slightly downwardly toward a centermost portion of the disc 83. The free end portion 102 of the fixed blade 98 is also provided with an abrasive 103 on the under surface thereof, and carries a tungsten carbide tooth 104 depending downwardly therefrom but secured as by welding thereto, the tooth 104 having its leading edge 105 facing in a reverse direction to the leading edges of any of the teeth 91, 94 or 95 in the immediate vicinity beneath the tooth 104, for providing increased shearing as solid particles are lifted upwardly by the surface of a "ski block" 92 and are engaged between the three teeth 94, 95 and 104.

Shearing portions of each tooth 104 will be spaced from corresponding adjacent portions of each of the teeth 94 or 95 by a predetermined amount, for example, one-eighth inch as is the tooth 43 of FIG. 2 spaced from the lower surface of the fixed blade 24 by an amount generally set at one-eighth inch, but such spacing distance can be varied if desired. However, the particular arrangement of FIGS. 5 and 6 whereby particles may be engaged between the three teeth 94, 95 and 104 and whereby an abrasive 103 is provided on opposite sides of the tooth 104 above portions of the teeth 94 and 95 has been found to be an extremely effective arrangement for effecting size reduction of rags, plastic sheets and other materials.

Figure 7:
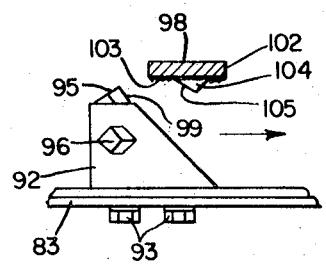
FIG. 7 is a fragmentary view taken generally along the line VII-VIII OF FIG. 5, wherein there is illustrated the relative disposition of the fixed and moving elements of this form of cutting means of this invention.

With particular reference to FIG. 7, there is illustrated a side view showing the approach of a "ski block" 92 with a tooth 95 carried at an uppermost portion thereof toward a fixed blade 98 and in particular the approach of the moving tooth 95 toward a fixed tooth 104. It will be noted that the forward edge 99 of the tooth 95 is in nonparallel relationship to the rearwardly directed but leading edge 105 of the tooth 104. This is to effect a shearing and to assure the same rather than allowing solids to become lodged between parallel surfaces of the teeth 95 and 104, and has been found to be effective for this purpose.

It will be apparent to one skilled in the art that various modifications can be made in the materials of construction, and in the arrangements and interarrangement of various parts of the pulping apparatus of this invention without departing from the spirit and scope of the invention as recited in the appended claims. Also, various changes in the operating techniques may also be effected, all within the scope of the invention.

We claim:

1. An apparatus for use in pulping solids into substantially reduced sizes comprising tank means for receiving solids therein in a liquid medium, rotary impeller means disposed within said tank means, and cutting means carried by each of said tank means and said impeller means for effecting a scissorslike cutting therebetween of solids within said tank means, said cutting means including a substantially horizontally disposed blade having a cutting portion thereon, wherein said tank means includes a ring-like portion having a substantially upstanding cylindrical sidewall with substantially horizontally directed fluid outlet openings therein.

2. The apparatus defined in claim 1, wherein said cutting means comprises at least one fixed blade carried by said tank means and at least one cooperating cutting member which is rotatably movable with said impeller means.

3. An apparatus for use in pulping solids into substantially reduced sizes comprising tank means for receiving solids therein in a liquid medium, rotary impeller means disposed within said tank means, and cutting means carried by each of said tank means and said impeller means for effecting a scissorslike cutting therebetween of solids within said tank means, wherein said cutting means comprises at least one fixed platelike blade carried by said tank means and at least one cooperating cutting member which is rotatably movable with said impeller means but spaced inwardly from an outer edge thereof, wherein said fixed blade is substantially horizontally disposed and said cutting member extends vertically upwardly from said impeller means toward, but terminating below said fixed blade, with said impeller means also being substantially horizontally disposed.

4. The apparatus defined in claim 3, wherein said cutting member includes a separate hardened cutting element fixedly secured on an uppermost end portion thereof.

5. An apparatus for use in pulping solids into substantially reduced sizes comprising tank means for receiving solids therein in a liquid medium, rotary impeller means disposed within said tank means, and cutting means carried by each of said tank means and said impeller means for effecting a scissorslike cutting therebetween of solids within said tank means, wherein said cutting means comprises at least one fixed blade carried by said tank means and at least one cooperating cutting member which is rotatably movable with said impeller means, wherein said fixed blade is substantially horizontally disposed and said cutting member extends vertically upwardly from said impeller means toward, but terminating below said fixed blade, with said impeller means also being substantially horizontally disposed, wherein said fixed blade includes an abrasive lower surface.

6. An apparatus for use in pulping solids into substantially reduced sizes comprising tank means for receiving solids therein in a liquid medium, rotary impeller means disposed within said tank means and said impeller means for effecting a scissorslike cutting therebetween of solids within said tank means, wherein said cutting means comprises at least one fixed blade carried by said tank means and at least one cooperating cutting member which is rotatably movable with said impeller means, wherein said fixed blade is substantially horizontally disposed and said cutting member extends vertically upwardly from said impeller means toward, but terminating below said fixed blade, with said impeller means also being substantially horizontally disposed, wherein said cutting member includes a radially outwardly directed cutting element disposed on a radially outermost surface thereof relative to said impeller means.

7. An apparatus for use in pulping solids into substantially reduced sizes comprising tank means for receiving solids therein in a liquid medium, rotary impeller means disposed within said tank means, said impeller means being generally of disclike configuration and having cutting means thereon, said tank means including a ringlike portion having a substantially upstanding cylindrical sidewall with substantially horizontally directed fluid outlet openings therein, said ringlike portion being spaced radially outwardly of said impeller means, to provide a running clearance annulus with the outer edge of said impeller means, said annulus being spaced radially inwardly from and directed perpendicular to said fluid outlet openings of said ringlike portion, said impeller means being adapted to impel liquid through said openings, transversely across an adjacent end of said annulus.

8. An apparatus for use in pulping solids into substantially reduced sizes comprising tank means for receiving solids therein in a liquid medium, rotary platelike impeller means disposed within said tank means, and cutting means disposed within said tank means, including ramp means located at a central portion of said impeller means and carried at its lower end only on the upper end of said platelike impeller means and sloping upwardly substantially from an upper surface of said impeller means, for lifting solids through a liquid medium and away from a lower central portion of said impeller means, during rotation of said impeller means.

9. An apparatus for use in pulping solids into substantially reduced sizes comprising tank means for receiving solids therein in a liquid medium, rotary platelike impeller means disposed within said tank means, and cutting means disposed within said tank means, including ramp means located at a central portion of said impeller means and sloping upwardly substantially from an upper surface of said impeller means, for lifting solids through a liquid medium and away from a lower central portion of said impeller means, during rotation of said impeller means, wherein said ramp means comprises a wire member of helixlike configuration, connected to said impeller means at one end thereof.

10. An apparatus for use in pulping solids into substantially reduced sizes comprising tank means for receiving solids therein in a liquid medium, rotary platelike impeller means disposed within said tank means, and cutting means disposed within said tank means, including ramp means located at a central portion of said impeller means and sloping upwardly substantially from an upper surface of said impeller means, for lifting solids through a liquid medium and away from a lower central portion of said impeller means, during rotation of said impeller means, wherein said ramp means comprises a portion of a cylindrically configured member, the upper edge of which presents a ramp of continuously increasing height relative to said impeller means.

11. An apparatus for use in pulping solids into substantially reduced sizes comprising tank means for receiving solids therein in a liquid medium, rotary impeller means disposed within said tank means, and cutting means carried by each of said tank means and said impeller means for effecting a scissorslike cutting therebetween of solids within said tank means, wherein said tank means includes a ringlike portion having a substantially upstanding cylindrical sidewall with substantially horizontally directed fluid outlet openings therein, wherein said cutting means comprises an upstanding member carried by said impeller means and having a leading and a trailing end during rotation of said impeller means, said leading end being sloped at an acute angle relative to an upper surface of said impeller means.

12. The apparatus defined in claim 11, wherein said acute angle is less than 60°.

13. An apparatus for use in pulping solids into substantially reduced sizes comprising tank means for receiving solids therein in a liquid medium, rotary impeller means disposed within said tank means and cutting means carried by each of said tank means and said impeller means for effecting a scissorslike cutting therebetween of solids within said tank means, wherein said tank means includes a ringlike portion having a substantially upstanding cylindrical sidewall with substantially horizontally directed fluid outlet openings therein, wherein said cutting means comprises at least one fixed blade carried by said tank means and at least one cooperating cutting member which is rotatably movable with said impeller means, wherein said cutting member carries first and second cutting edges closely adjacent but spaced radially from each other relative to the center of said impeller means, said fixed blade carrying a cutting element with a third cutting edge, said third cutting edge being adapted to pass between said first and second cutting edges upon rotation of said impeller means.

14. The apparatus defines in claim 13, wherein said third cutting edge is adapted to cooperate with said leading first and second cutting edges in cutting solids as said first and second cutting edges approach said third cutting edge during rotation of said impeller means, said third cutting edge defining with each of said first and second edges an acute angle.

15. The apparatus defined in claim 13, wherein said cutting member includes a radially outwardly directed cutting element disposed on a radial outermost surface thereof relative to said impeller means.

16. An apparatus for use in pulping solids into substantially reduced sizes comprising tank means for receiving solids therein in a liquid medium, rotary impeller means disposed within said tank means, and cutting means carried by each of said tank means and said impeller means for effecting a scissorslike cutting therebetween of solids within said tank means, wherein said cutting means comprises at least one fixed blade carried by said tank means and at least one cooperating cutting member which is rotatably movable with said impeller means, wherein said fixed blade is substantially horizontally disposed and said cutting member extends vertically upwardly from said impeller means toward, but terminating below said fixed blade, with said impeller means also being substantially horizontally disposed, wherein said impeller means is generally of disclike configuration and having cutting means thereon, said ringlike portion being spaced radially outwardly of said impeller means, to provide a running clearance annulus with the outer edge of said impeller means, said annulus being spaced radially inwardly from and directed perpendicular to said fluid outlet openings of said ringlike portion, said impeller means being adapted to impel liquid through said openings transversely across an adjacent end of said annulus, including ramp means located at a central portion of said impeller means, for lifting solids through a liquid medium and away from a lower central portion of said impeller means, during rotation of said impeller means, wherein said cutting member carries first and second cutting edges closely adjacent but spaced radially from each other relative to the center of said impeller means, said fixed blade carrying a cutting element with a third cutting edge, said third cutting edge being adapted to pass between said first and second cutting edges upon rotation of said impeller means, and with the lower surface of said fixed blade having an abrasive thereon.